United States Patent
Johnson

[11] 3,794,409
[45] Feb. 26, 1974

[54] METHOD AND APPARATUS FORMING PLURAL FOCUSED IMAGES WITH A COMMON LENS SYSTEM

[75] Inventor: Winston O. Johnson, Atlanta, Ga.

[73] Assignee: Lockheed Aircraft Corporation, Burbank, Calif.

[22] Filed: Dec. 17, 1971

[21] Appl. No.: 209,399

Related U.S. Application Data

[63] Continuation of Ser. No. 26,971, April 9, 1970, abandoned.

[52] U.S. Cl.............. 350/194, 350/193, 350/204, 353/81
[51] Int. Cl. .......................................... G02b 27/00
[58] Field of Search ... 350/204, 193, 194, 197, 213, 350/189

[56] References Cited
UNITED STATES PATENTS

| | | | |
|---|---|---|---|
| 2,258,903 | 10/1941 | Mitchell | 350/204 UX |
| 3,299,768 | 1/1967 | Alvarez | 350/204 UX |
| 2,286,242 | 6/1942 | Terwilliger | 350/194 UX |
| 2,350,151 | 5/1944 | Dahl | 350/204 UX |
| 521,064 | 6/1894 | Weyde | 350/189 |

FOREIGN PATENTS OR APPLICATIONS

| | | | |
|---|---|---|---|
| 513,250 | 10/1939 | Great Britain | 350/194 |
| 835,311 | 9/1938 | France | 350/204 |

*Primary Examiner*—John K. Corbin
*Attorney, Agent, or Firm*—George C. Sullivan; Albert L. Carter

[57] ABSTRACT

Method and apparatus for focusing a selected portion of an object at a conjugate plane different from the conjugate plane of focus of other portions of the object. A focus change member made of a material having a refractive index different from that of air is placed adjacent the object, which may be a film negative or transparency. The portion of the object which is covered by the focus change member appears to lie closer to the focusing lens than does the uncovered portion of the object, so that the lens projects the focused image of the portion covered by the focus change member to a greater distance than the focused image of the uncovered portion of the object. A technique is also described for photographically enlarging an object to obtain discrete areas of dissimilar magnification on an image plane, and to obtain a magnification which is variable along a dimension of the image plane.

12 Claims, 8 Drawing Figures

PATENTED FEB 26 1974 3,794,409

INVENTOR.
WINSTON O. JOHNSON
BY George Sullivan
        Agent
   Roger T. Frost
        Attorney

METHOD AND APPARATUS FORMING PLURAL FOCUSED IMAGES WITH A COMMON LENS SYSTEM

This is a continuation of application, Ser. No. 26,971 filed Apr. 9, 1970, and now abandoned.

This invention relates in general to an optical focusing system and in particular to an optical focusing system which enables selected portions of an object to be focused with differing magnification and at conjugate planes spaced at different distances from a focusing lens.

A basic projection optical system comprises an object such as a photographic transparency or negative, a light source for illuminating the object, and a lens selected to focus an image of the object at a desired location. The focal length of the lens or lens system is chosen according to known optical relationships. The magnification of the projected image with respect to the size of the object transparency also is determined by the focal length of the lens and is the ratio of the lens-conjugate plane distance to the lens-object distance.

Photographic information storing systems, such as systems using microfilm, frequently reserve a portion of each film frame to receive digital data, with the remainder of the film frame being available to receive visual data or the like. For example, each frame of microfilm can contain one or more pages of directory data, and the digital data portion of each such frame can contain encoded information on the page or frame number, the initial and final items entered on that page or frame, and other data needed to retrieve the substantive information recorded on the film. When microfilm of this type is loaded onto a suitable apparatus for viewing or information retrieval purposes, the digital data portion of each frame is projected, for example, onto a sensor panel comprising an array of photocells, while the remainder of each frame may be projected onto a viewing screen or another suitable location. The digital coded signals caused by the light from the digital data portion of the film impinging on the photocell array control the selection and positioning of the frames in response to manual or machine-produced instructions.

While it is usually desirable to project both the visual data and the digital data with a common optical system, it sometimes is necessary to project the digital data onto a plane spaced from the projection lens a distance which is different from the spacing from the lens to the plane onto which the visual data is projected for viewing. Furthermore, it may be necessary or desirable to project the digital data portion of the frame at a magnification factor different from that of the visual data so that the size of the photocell array can be minimized while the desired magnification of the visual data is maintained.

Prior art techniques for projecting portions of a single frame onto planes at different distances from the projection lens have been proposed. For example, the typical microfilm reading apparatus requires that the photocell panel be closer to the projection lens than the visual viewing member. If a projection lens having an acceptably large depth-of-field is used, and the photocell panel is designed to accept an image which is somewhat out of focus and somewhat smaller than the visual image, then the photocell panel can be mounted more closely to the projection lens than the viewing member. Practical considerations, such as lens selection, the brightness of the projected image, and other factors, usually mean that the lens-photocell distance can be no less than 90 percent of the lens-projection member distance, a reduction which is insufficient in many applications.

Another technique of the prior art requires the use of image path separation techniques, such as mirrors and separate focusing lenses, to split various portions of a single film frame into separate optical paths. While this technique affords greater flexibility in the positioning of the photocell and the viewing member, it has the disadvantages of requiring complex and expensive multiple optical systems.

Accordingly, it is an object of this invention to provide an improved optical system.

Another object of the present invention is to provide an improved optical system permitting selected portions of an object to be focused onto different conjugate planes.

Another object of this invention is to provide an optical system in which selected portions of an object are focused with a single lens system onto different conjugate planes.

It is still another object of this invention to provide an optical system in which selected portions of a projection transparency or negative are focused with a single focusing lens system onto different conjugate planes.

Another object of this invention is to provide an optical system in which selected portions of an object are projected onto a common conjugate plane to have dissimilar magnification.

A further object of this invention is to provide an optical system in which selected portions of an object are projected onto a common conjugate plane to define discrete areas of dissimilar magnification.

Still another object of this invention is to provide an optical system in which a selected portion of an object is projected with a variable amount of magnification onto a conjugate plane to have an amount of magnification which is variable along a dimension of the plane.

Other objects and many of the attendant advantages of the present invention will be evident upon examination of the accompanying figures in which.

The technique of the present invention, stated in general terms, comprises placing a transparent focus change member adjacent the transparency or other object so as to cover only the object portion which requires the greater magnification and which is to be focused the greater distance from the projection lens. The focus change member is made of a material having a refractive index greater than that of air, so that the portion of the object seen through the focus change member appears to be closer to the lens than the remaining or uncovered portion of the object. An image of the object portion covered by the focus change member thus is projected to be focused at a greater distance beyond the lens than the distance at which the focused image of the uncovered portion of the object is projected, and the magnification of the image focused at the greater distance from the lens is greater than the magnification of the other image.

Figure 1:
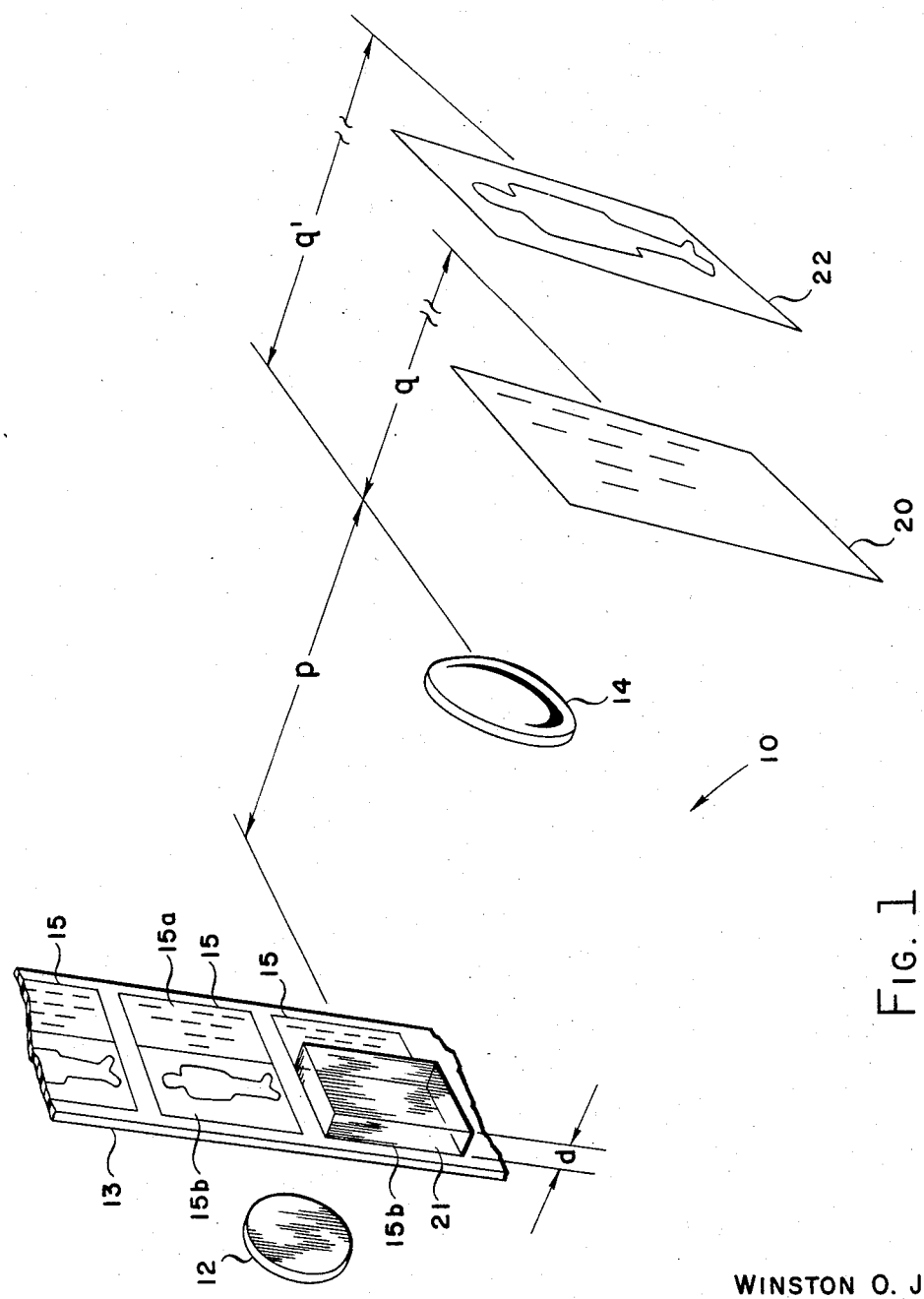
FIG. 1 is an isometric view schematically depicting an embodiment of the present invention.

Stated more particularly and with reference to the embodiment shown in FIG. 1, there is shown generally at 10 an optical projection system including a projection lamp 11, a condensing lens 12, a portion of a film strip 13, and a projection or focusing lens 14. Although the projection lens 14 is shown as a single-element lens, it will be understood by those skilled in the art that multiple-element lenses are frequently used for projection purposes, and such lenses can be used in the present invention. The film 13, by way of example, is shown to consist of a number of separate frames 15, each of which is divided into a digital portion 15a and a pictorial portion 15b.

The relationship between the object and image distances for a lens arrangement of the type shown herein is given by the well known formula:

$$1/f = 1/p + 1/q \quad (1)$$

where $f$ = the focal length of the lens
$p$ = the distance from the object to the lens
and $q$ = the distance from the lens to the conjugate plane where the image of the object appears in sharp focus.

The magnification of the lens arrangement is given by the formula:

$$\text{Magnification } (M) = q/p \quad (2)$$

The image of the digital portion 15a of a particular frame of the film 13 positioned a distance $p$ from the lens 14 thus is sharply focused at the conjugate plane 20 spaced a distance $q$ from the lens, and a photocell array utilizing the digital information contained on the digital frame portion 15a would be positioned to utilize the image present at the conjugate plane 20 or at a plane sufficiently near the plane 20 to provide the desired magnification with acceptably sharp focus.

A focus change member 21 is disposed between the lens 14 and the film 15, with the focus change member being positioned closely adjacent the film to cover that portion of the film frame, such as the pictorial portion 15b, which is to be focused at some conjugate plane 22 a greater distance from the lens than the plane 20. The focus change member 21 in the embodiment of FIG. 1 preferably is a planar transparent member of good optical quality and made of a material such as glass, plastic, quartz, or another suitable material having a refractive index greater than that of air. The frame portion 15b covered by the focus change member 21 appears to be closer to the lens 14 than the uncovered frame portion 15a because the refractive index of the focus change member is greater than that of air. The apparent movement $s$ of the pictorial portion 15b toward the lens 14 is $$s = [d(n-1)]/n \quad (3)$$

where
$d$ is the thickness of the focus change member and
$n$ is its refractive index relative to air. The apparent position $p'$ of the frame portion 15b covered by the focus change member 21, as seen by the lens 14, is $$p' = p - s \quad (4)$$

Since the apparent location $p'$ of the pictorial portion 15b is closer to the lens 14 than the digital portion 15a, the sharply focused image of the pictorial portion occurs at the conjugate plane 22 located a distance $q'$ beyond the lens 14, with $q'$ being greater than $q$.

Figure 2:
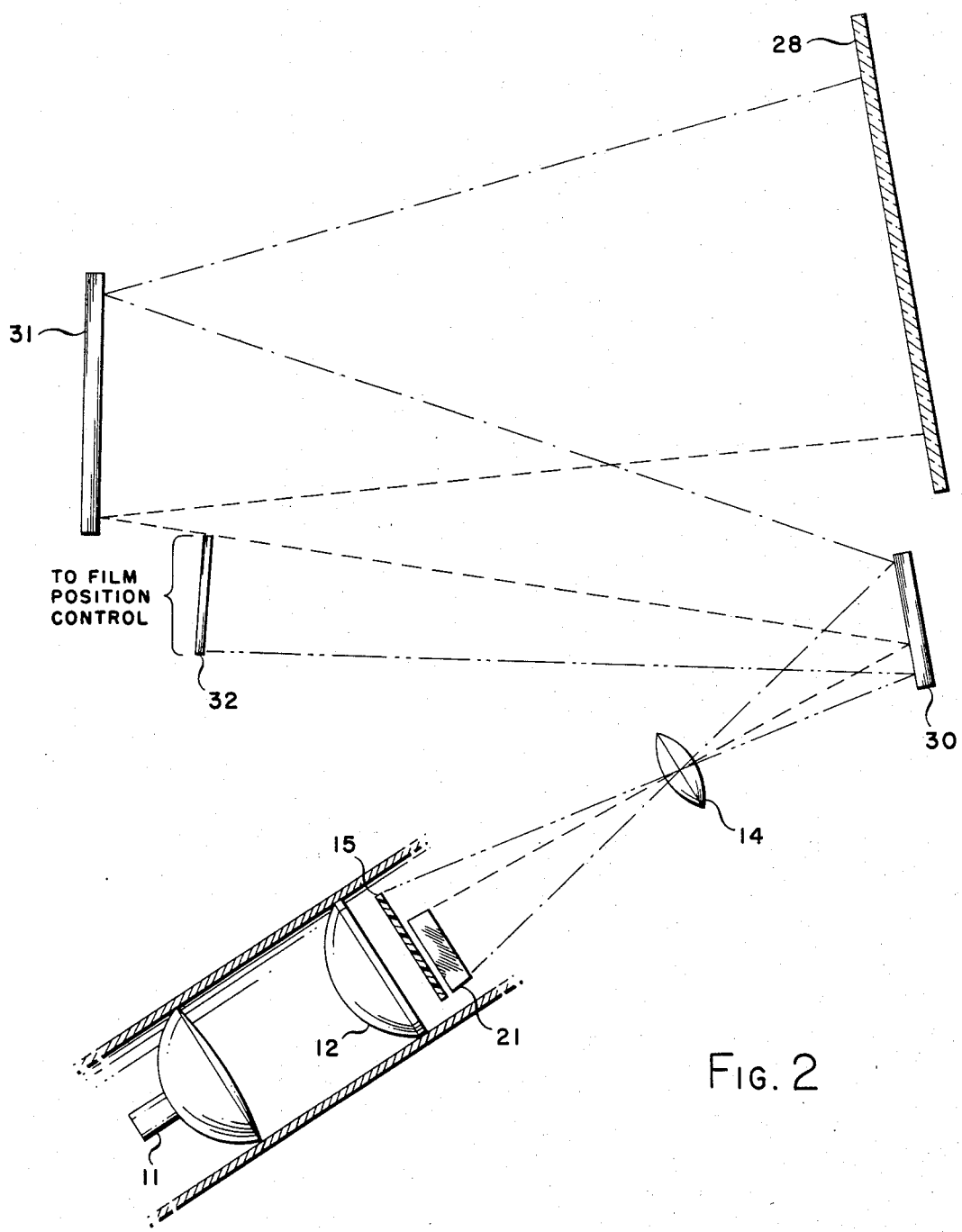
FIG. 2 is a schematic view showing an embodiment of the present invention used with a folded optical system.

The following numerical example further illustrates the utility of the present invention as embodied in FIG. 1. Assume an optical system, as depicted therein, where it is desired to image the digital portion 15a of the film at a distance $q$ of 25 inches from a lens 14 having a focal length $f$ of 1.968 inches (50 mm). Solving Equation (1) indicates that the lens must be located a distance $p$ of 2.135 inches from the film. If it is assumed that the image of the pictorial frame portion 15b is to be focused onto a conjugate plane 22 positioned, for example, a distance $q'$ of 45 inches from the lens, and if the focus change member 21 is made of glass having a refractive index $n$ of 1.5, then substitution of $q'$ and the known focal length into Equation (1) indicates that $p'$, the apparent distance from the pictorial frame portion 15a to the lens 14, must be 2.055 inches. The thickness $d$ of the focus change member 21 must be selected to make the pictorial frame portion 15b appear to have been moved $s = 0.080$ inches (2.135 inches $-$ 2.055 inches) closer to the lens. Applying these values of $s$ and $n$ to Equation (3) and solving for $d$ shows that the focus change member must be 0.24 inches in thickness to accomplish the desired result that the pictorial image is focused at the conjugate plane 22, located 45 inches from the lens, while the digital image is focused through the same lens to the conjugate plane 20, located 25 inches from the lens. The magnification $M'$ of the pictorial image is $q'/p' = 21.9$, while the magnification $M$ of the digital image is $q/p = 11.7$ FIG. 2 shows an embodiment of the present invention as applied to a film viewing apparatus, wherein the optical system is folded to reduce the physical size of the apparatus and wherein the pictorial image is projected onto a suitable viewing device such as a ground glass screen 28. The projection lamp 11 and condensing lens 12 are mounted in a suitable housing 29 to illuminate the film 15, shown in end section view passing through the projection mechanism. A focus change member 21 is positioned to cover a portion of the film 15, it being assumed for purposes of illustration that the covered portion of the film contains pictorial or other images to be projected onto the ground glass screen 28 and that the uncovered portion of the film 15 contains digital or other information to be focused onto a location less distant from the lens 14. It will also be understood by those skilled in the art that a practical film transport mechanism may include such items as a film drive, a film gate, a pressure plate, and other devices which form no part of the present invention and which are omitted from the description thereof for purposes of clarity.

Illumination passing through the portion of the film 15 covered by the focus change member 21 passes through the lens 14 to be reflected from a first mirror 30 and a second mirror 31 for focused projection onto the ground glass screen 28. The illumination passing through the uncovered portion of the film 15 similarly passes through the lens 14 and is reflected by the first mirror 30. The photocell panel 32 is positioned to intercept the illumination from the uncovered portion of the film and to prevent such illumination from striking the second mirror 31. The various parameters of lens focal length, the position of the film 15 and the screen 28 with respect to the lens, and the thickness and refractive index of the focus change member 21 are selected so that the image from the uncovered portion of the film 15 is focused on the photocell panel 32 while the image from the portion of the film covered by the focus change member 21 is focused on the ground glass screen 28. It is apparent that the image projected onto the photocell panel 32 is magnified less than the image projected onto the screen 28, and so the size and location of the photocell panel can be conveniently and economically chosen without compromising the location of the screen 28 or the size of the pictorial image projected thereon.

In addition to permitting selected areas of an object to be projected onto conjugate planes of dissimilar spacing from a projection lens, the present invention also comprehends the projection of a focused image onto a common or single conjugate plane in such a way that different portions of the image have different amounts of magnification. Referring to the embodiment depicted in FIG. 3, for example, there is shown image projection apparatus of the type exemplified by a photographic enlarger, a slide or motion picture projector, or the like, and including a projection lamp 11, a condensing lens 12, a projection lens 14, and an iris 36. A projection object 37, such as a photographic transparency or negative, is positioned in the optical axis of the apparatus. A focus change member 39, which may be a transparent member made of glass or another suitable material and having parallel planar sides 40, is positioned between the film 37 and the lens 14 adjacent a desired portion 37a of the film. It is important to the proper operation of this embodiment and other embodimetns of the present invention that the focus change member 39 be positioned as closely as practicable to the film or other projection object.

An image 38b of the uncovered portion 38a of the film is focused onto a conjugate plane 38c by the lens 14, while the image 37b of film portion 37a, which is seen through the focus change member 39 by the lens and which thus appears to be closer to the lens than the portion 38a, is in focus at a conjugate plane 37c spaced from the lens a distance greater than the spacing of the plane 38c. If the lens 14 is "stopped down" by reducing the aperture of the iris 36, each of the respective conjugate planes of critical or exact focus of the images 37b and 38b lies within a zone of acceptable focus, as bracketed in FIG. 3. These zones of acceptable focus, known as the "depth of field" of the particular lens-iris combination, increase in depth as the opening of the iris 36 is reduced so that only a correspondingly reduced portion of the lens area is utilized to focus the respective images.

Figure 3:
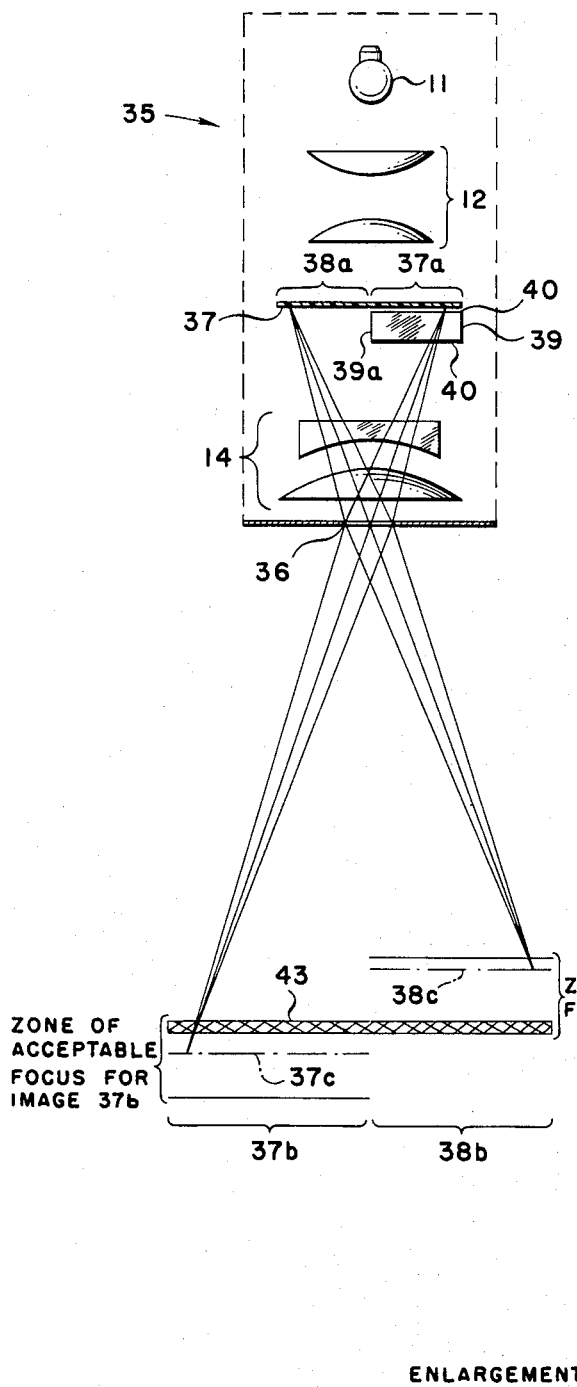
FIG. 3 is a schematic view of another embodiment of the present invention wherein an object is projected to obtain discrete areas of dissimilar magnification on a common image plane.

It can be seen from FIG. 3 that if the proper combination of spacings from the lens 14 to the respective conjugate planes 37c and 38c is chosen in combination with an appropriately extensive depth of field, there is a zone 43 of overlap between the respective zones of acceptable focus in which the image portions 37b and 38b are focused. This overlapping zone 43 represents the zone of best overall focus of the two image portions; a projection screen or other suitable planar member disposed in the zone 43 perpendicular to the optical axis receives focused images 37b and 38b.

Figure 4A:
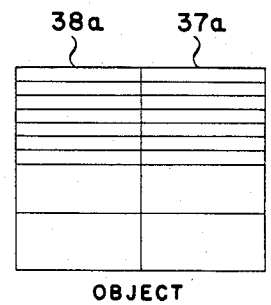
FIG. 4A shows an illustrative object to be projected with the apparatus as in FIG. 3.
Figure 4B:
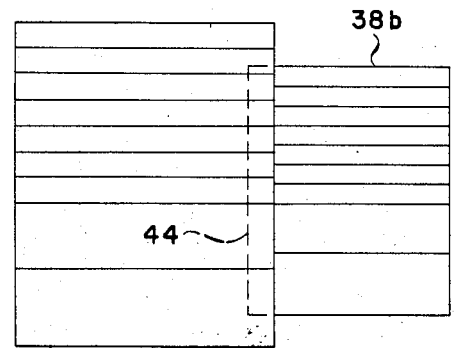
FIG. 4B shows an image of the FIG. 4A object as projected with different amounts of magnification.

The results of the enlargement or projection accomplished with the FIG. 3 apparatus are illustrated by the examples of FIG. 4A, wherein 37a and 38a represent corresponding portions of a film being projected with the apparatus of FIG. 3 so that the portion 37a is magnified to a greater extent than the magnification of the portion 38a. The results of this unequal magnification are shown in FIG. 4B, wherein 38b, the image of film portion 38a, is enlarged or magnified to a lesser extent than 37b, the image of the film portion 37a covered by the focus change member 39. In the example depicted in FIG. 4B it is assumed that both of the images 37b and 38b occur on a common plane within the zone of overlap 43, and so the distance $q$ from the lens 14 to the conjugate plane of projection of each image is the same. However, $p'$, the apparent distance from the lens 14 to the film portion 37a, is less than the actual lens-film distance because of the effect of the focus change member 39, and so the magnification of the image 37b is greater than the magnification of the image 38b.

The greater magnification of the image 37b causes that image to occupy an area greater than the area of the image 38b, even if it is assumed that the corresponding film portions 37a and 38a are of equal area, and so there is a region 44 shown in FIG. 4B where the two images overlap and interfere with each other. This interference is minimized in extent if the focus change member 39 is designed so that its edges which define the zone of changed focus lie in a plane or planes passing through the nodal point of the projection lens 14. In the example of FIG. 3, accordingly, at least the edge 39a, which is shown to be substantially aligned with the optical axis of the apparatus and which defines the boundary between the two images 37b and 38b, should be perpendicular to the parallel faces 40 of the focus change member 39. If the focus change member 39 were displaced laterally, for example, the edge 39a would meet the faces 40 at a nonperpendicular angle to permit the edge to lie in a plane passing through the lens nodal point.

Figure 5:
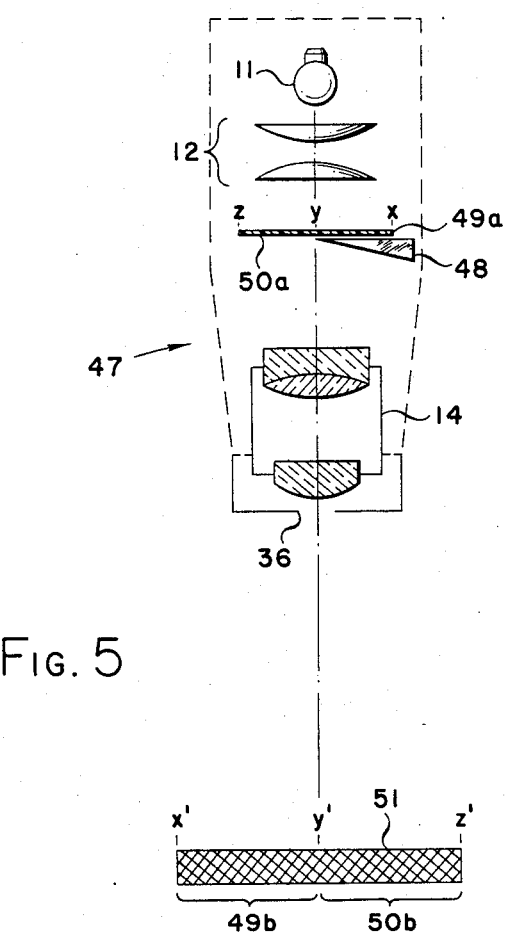
FIG. 5 is a schematic view of another embodiment of the present invention wherein an object is projected to obtain a magnification which is variable along a dimension of a portion of the image plane.
Figure 6A:
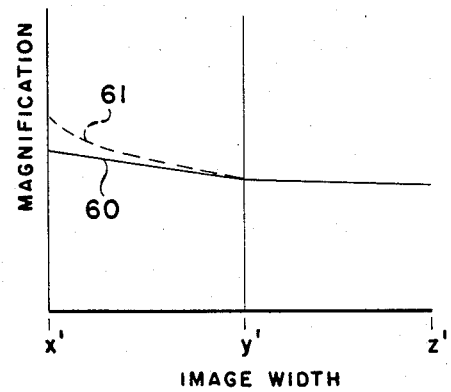
FIG. 6A is a graph showing an example of the variable magnification obtainable with the apparatus as in FIG. 5.

FIG. 5 shows a projection apparatus which is indicated generally at 47 and which is comparable to the projection apparatus 35 of FIG. 3, except that a focus change member 48 in the shape of a prism is substituted for the focus change member 39. The film disposed in the apparatus 47 for projection includes a portion 49a, which is covered by the focus change prism 48, and an uncovered film portion 50a. The film is represented in FIG. 5 as having the dimension of width extending from one edge $x$ through the location $y$, through which passes the optical axis of the projection apparatus, to the opposite edge $z$. Since the focus change prism 48 is shown to be positioned in FIG. 5 so that the prism edge of least thickness is adjacent the projection optical axis, the extent to which the film portion 49a appears closer to the lens than the film portion 50a varies linearly from a maximum at the film location $x$ to a minimum or nominal amount at the film location $y$. If the considerations of the maximum thickness of the focus change prism 48 and the opening of the iris 36 are selected so that a zone 51 of best focus exists for both of the images 49b and 50b, then the magnification of the image projected onto a plane perpendicular to the optical axis and positioned in the zone 51 is constant from $z'$ to $y'$ corresponding to the uncovered film portion 50a, and increases from $y'$ to a maximum magnification at $x'$, corresponding to the film portion 49a covered by the focus change prism 48. The change in magnification of the projected image is graphically shown at line 60 of FIG. 6A as a linear function of the width displacement along the film. If the image is not projected onto a perpendicular plane, the change in magnification is nonlinear due to the reciprocal relation of $q'$ in Equation (1) and is represented by line 61 of FIG. 6A.

Figure 6B:
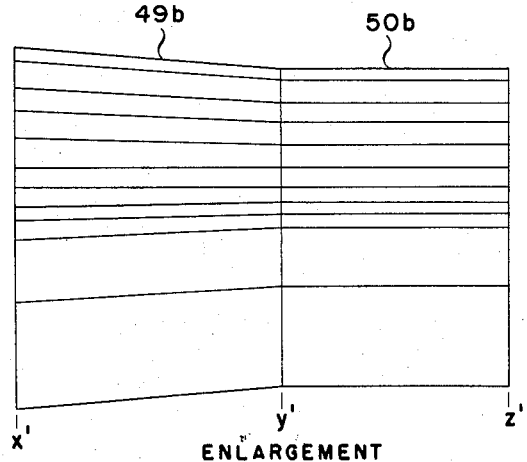
FIG. 6B shows an image of the FIG. 4A object as projected with the variable magnification depicted in FIG. 6A.

FIG. 6B shows the object of FIG. 4A as enlarged with varying magnification in the apparatus 47.

While the foregoing description refers to embodiments having a portion of the object covered with a focus change member and the remainder of the object not so covered, the invention includes other arrangements using plural focus change members, such as several focus change members of equal or unequal thickness covering plural selected portions of the object, a focus change member of one thickness covering one portion of the object and a focus change member of a different thickness (or having a different refractive index) covering the remainder of the object, and the like.

It should be understood, of course, that the foregoing relates only to preferred embodiments of the invention and that numerous modifications or alterations may be made therein without departing from the spirit and the scope of the invention as set forth in the appended claims.

What is claimed is:

1. Apparatus for establishing plural focused image portions of an object at focally displaced conjugate planes, comprising:
   lens means positioned to receive illumination reflected from the object;
   a focus change member interposed between the object and said lens means to cover only a portion of the object,
   said focus change member being substantially transparent and having a refractive index unequal to the refractive index of the medium through which the illumination from the object to said lens means otherwise travels, so that the optical distance from the covered portion of the object to said lens means is unequal to the optical distance from the uncovered portion of the object to said lens means;
   said lens means being positioned to cause the illumination from the covered portion of the object to pass entirely through a medium having a certain refractive index to be in focus at a conjugate plane, and also to cause the illumination from the uncovered portion of the object to pass entirely through a medium having said certain refractive index to be in focus at a second conjugate plane dissimilar from the first conjugate plane, said second conjugate plane focally displaced from said first conjugate plane.

2. Apparatus as in claim 1, further comprising:
   first utilization means positioned substantially proximate said first conjugate plane to intercept a usably focused image from one of said portions of the object and to permit the image of the other of said portions of the object to pass onward to said second conjugate plane.

3. Apparatus as in claim 2, further comprising:
   second utilization means positioned substantially proximate said second conjugate plane to intercept a usably focused image of said other portion of the object.

4. Apparatus as in claim 1, wherein said focus change member is positioned closely proximate said covered portion of the object.

5. Apparatus as in claim 4, wherein:
   said lens means has a first predetermined depth of field defining a first range of distance from the lens means wherein the image of the uncovered object is substantially in focus; and
   said focus change member is dimensioned to cause said lens means to substantially focus the image of said covered portion in a predetermined depth of field having a second range of distance from the lens means which is at least partially coextensive with said first range of distance so that a common image plane exists whereat both the image of said uncovered portion of the object and the image of said covered portion of the object are substantially in focus.

6. Apparatus as in claim 4, wherein said focus change member comprises a transparent member the thickness of which, as measured in a dimension parallel to the optical axis of said lens means, varies as a function of a certain dimension of said covered portion of the object.

7. Apparatus as in claim 6, wherein said variation in the thickness of said transparent member is a linear function of said certain dimension.

8. Apparatus as in claim 4, wherein said focus change member comprises a transparent member having a pair of substantially planar parallel sides disposed substantially perpendicularly to the optical axis of said lens means.

9. The method of projection imaging an object wherein the projection image of one portion of the object is magnified by an amount which is different from the magnification of the projection image of another portion of the object, comprising the steps of:
   passing illumination from one portion of the object to a lens means through a focus change member having an index of refraction unequal to 1.0 relative to the medium through which the illumination travels;

passing illumination from another portion of the object to said lens means without passing through said focus change member so that the optical distance from the one portion of the object to the lens means is unequal to the optical distance from the other portion of the object to the lens means; and passing said first and second illumination portions from the lens means through medium having the same index of refraction for each illumination portion to focus a projection image of said one portion at a first distance spaced from the lens means and at a first amount of magnification and to focus a projection image of said other portion at a second distance spaced from the lens means which is dissimilar from said first distance and at a second amount of magnification.

10. The method of claim 9, further comprising:
substantially focusing the projection image of said one portion of the object within a first depth of field; and
substantially focusing the projection image of said other portion of the object within a second depth of field at least a portion of which is coextensive with a portion of said first depth of field so that in the coextensive region both of said projection images are substantially focused and have dissimilar magnification.

11. The method of claim 9, further comprising:
producing the projection image of said one portion of the object to be substantially focused within a first depth of field; and
producing the projection image of said other portion of the object to be substantially focused within a second depth of field which is substantially exclusive of said first depth of field.

12. The method of claim 9, further comprising:
varying the thickness of the focus change member along a selected dimension to produce a focused projection image of said one portion having a magnification the amount of which varies along a corresponding dimension of said image.

* * * * *